United States Patent
Lemay et al.

(10) Patent No.: US 10,127,468 B1
(45) Date of Patent: Nov. 13, 2018

(54) SYSTEM AND METHOD FOR CAPTURING, ORGANIZING, AND STORING HANDWRITTEN NOTES

(71) Applicant: Rocket Innovations, Inc., Melrose, MA (US)

(72) Inventors: Joseph Lemay, Melrose, MA (US); Jacob Epstein, Medford, MA (US)

(73) Assignee: Rocket Innovations, Inc., Melrose, MA (US)

( * ) Notice: Subject to any disclaimer, the term of this patent is extended or adjusted under 35 U.S.C. 154(b) by 182 days.

(21) Appl. No.: 15/211,462

(22) Filed: Jul. 15, 2016

Related U.S. Application Data

(60) Provisional application No. 62/193,915, filed on Jul. 17, 2015.

(51) Int. Cl.

| | |
|---|---|
| *H04N 1/04* | (2006.01) |
| *G06K 9/32* | (2006.01) |
| *H04N 1/387* | (2006.01) |
| *H04N 1/00* | (2006.01) |
| *H04N 1/32* | (2006.01) |

(Continued)

(52) U.S. Cl.
CPC ........... *G06K 9/325* (2013.01); *G06K 9/2027* (2013.01); *H04N 1/00689* (2013.01); *H04N 1/00708* (2013.01); *H04N 1/2166* (2013.01); *H04N 1/32133* (2013.01); *H04N 1/3875* (2013.01); *G06K 19/06028* (2013.01)

(58) Field of Classification Search
CPC ............ G06K 9/6203; G06K 17/0016; G06K 2209/01; G06K 9/00; G06K 9/00442; G06K 9/2054; G06K 9/2063; G06K 9/228; G06K 9/685; G06K 9/72; H04N 1/00204; H04N 1/00244; H04N 1/00326; H04N 1/0036; H04N 1/00363; H04N 1/00374; H04N 1/00381; H04N 1/107; H04N 1/2166; H04N 1/2187; H04N 1/32128; H04N 1/34; H04N 2201/0081; H04N 2201/3215; H04N 2201/3249; H04N 2201/3253; H04N 2201/3263; H04N 2201/3266; H04N 2201/3277; H04N 2201/3278
USPC ................ 235/380, 382, 454, 494; 358/473; 382/181, 313, 321; 709/201, 203
See application file for complete search history.

(56) References Cited

U.S. PATENT DOCUMENTS

| | | |
|---|---|---|
| 4,725,462 A | 2/1988 | Kimura |
| 5,786,838 A | 7/1998 | Steinhauser et al. |

(Continued)

*Primary Examiner* — Negussie Worku
(74) *Attorney, Agent, or Firm* — Nutter McClennen & Fish LLP

(57) ABSTRACT

Handwritten notes are captured organized and stored by a system as a digital representation. The system includes a notebook having a set of pages, wherein each page has placed thereon a folio identifier representation, such representation including a page identifier. The system also includes a non-transitory computer readable medium encoded with instructions, which, when running on a camera-equipped computing device at a time when the camera thereof views a page of the notebook, cause performance of processes. The processes performed by the instructions include: processing an image associated with the page, detecting and decoding the folio identifier representation to provide a page identifier for the page, and if the image has not been previously captured, then capturing the image of the page and saving the image in an image store.

23 Claims, 17 Drawing Sheets

(51) Int. Cl.
*H04N 1/21* (2006.01)
*G06K 9/20* (2006.01)
*G06K 19/06* (2006.01)

(56) References Cited

U.S. PATENT DOCUMENTS

| | | | |
|---|---|---|---|
| 5,873,604 A | 2/1999 | Phillips | |
| 5,984,364 A | 11/1999 | Diamond | |
| 6,030,000 A | 2/2000 | Diamond | |
| 6,346,024 B1 | 2/2002 | Engel | |
| 6,427,078 B1* | 7/2002 | Wilska | G06F 1/1616 348/14.02 |
| 6,663,008 B1* | 12/2003 | Pettersson | G06F 3/03545 235/494 |
| 6,667,693 B1* | 12/2003 | Kim | H04N 5/445 340/461 |
| 8,662,893 B2 | 3/2014 | Schwendimann et al. | |
| 9,844,965 B1* | 12/2017 | Lemay | B42D 3/123 |
| 2004/0070194 A1 | 4/2004 | Janetzke et al. | |
| 2004/0241385 A1 | 12/2004 | Huseman | |
| 2008/0050540 A1 | 2/2008 | Christofer et al. | |
| 2008/0308613 A1 | 12/2008 | Freder | |
| 2009/0026753 A1 | 1/2009 | Simske et al. | |
| 2009/0248796 A1* | 10/2009 | Johnston | G06F 3/0488 709/203 |
| 2011/0058187 A1* | 3/2011 | Smith | G06Q 10/06 358/1.9 |
| 2011/0212421 A1 | 9/2011 | Schwendimann et al. | |
| 2012/0104743 A1 | 5/2012 | Mehta et al. | |
| 2013/0255536 A1 | 10/2013 | Mehta et al. | |
| 2013/0318439 A1* | 11/2013 | Landis | G16H 15/00 715/705 |
| 2014/0119660 A1* | 5/2014 | Akashi | G06K 9/00865 382/189 |
| 2014/0268247 A1* | 9/2014 | Sakaida | H04N 1/387 358/406 |
| 2014/0299254 A1 | 10/2014 | Rackovan et al. | |
| 2014/0375046 A1 | 12/2014 | Wang et al. | |
| 2016/0096397 A1 | 4/2016 | Wakefield | |
| 2016/0260340 A1* | 9/2016 | Discount | G09B 5/125 |
| 2018/0134068 A1* | 5/2018 | Lemay | B43L 1/00 |

* cited by examiner

SYSTEM AND METHOD FOR CAPTURING, ORGANIZING, AND STORING HANDWRITTEN NOTES

PRIORITY

This application claims priority from U.S. Provisional Patent Application No. 62/193,915, filed Jul. 17, 2015, which is incorporated herein by reference in its entirety.

TECHNICAL FIELD

The present invention relates to digitizing handwritten notes, and more particularly to capturing handwritten notes on a note page that includes a folio identifier representation and directing the digitized notes to a destination location.

SUMMARY OF THE EMBODIMENTS

In accordance with one embodiment of the invention, handwritten notes are captured organized and stored by a system as a digital representation. The system includes a notebook having a set of pages, wherein each page has placed thereon a folio identifier representation, such representation including a page identifier. The system also includes a non-transitory computer readable medium encoded with instructions, which, when running on a camera-equipped computing device at a time when the camera thereof views a page of the notebook, cause performance of processes. The processes performed by the instructions include: processing an image associated with the page, detecting and decoding the folio identifier representation to provide a page identifier for the page, and if the image has not been previously captured, then capturing the image of the page and saving the image in an image store. The processing of the image may further include unwarping the page image into a rectangular image, removing a background from the page image, so that the image is cropped to conform to the page, enhancing the page image, and using the page identifier to determine if the image of the page has not been previously captured.

In other embodiments of the invention, each page of the notebook has a predominant background color, and a border having a border color that contrasts with the predominant background color. Further, the processes performed by the computing device include using presence of the border to detect presence of the page and boundaries of the page. In yet another embodiment, the processing of the image associated with the page to enhance the page image includes processing a plurality of images associated with the page to produce a composite image of the page. In a further embodiment, each page of the notebook has placed thereon a set of destination symbols, wherein a user can generally mark a selected destination symbol on a selected page of the notebook to indicate the start of a note set on the selected page and can otherwise mark the selected destination symbol on the selected page to indicate the continuation of a note set on the selected page. Additionally, the processes performed by the computing device further include:

- in a destination symbol process, determining, for each of the destination symbols on the page, whether such symbol has received general marking, continuation marking, or no marking;
- routing the page image to a set of destinations based on determinations from the destination symbol process.

In an embodiment of the invention, the processes performed by the computing device are performed while a plurality of pages of the notebook are being flipped by the user.

A destination symbol process determines for each of the destination symbols on the page, whether such destination symbol has received a marking, and adds the page to a note set associated with each marked destination symbol. In some embodiments, the destination is an email address and/or a Google drive document. The destination symbol may be marked by drawing a line at least partially through the destination symbol. The folio identifier representation may be a bar code or a quick response code. The removed background may be internal to the page on the image.

In accordance with another embodiment a method for capturing, organizing, and storing handwritten notes, provides a notebook having a set of pages. Each page in the set of pages has a folio identifier representation, the folio identifier representation including a page identifier, and a destination symbol configured to be marked by a user. The destination symbol is associated with a destination. The notebook is configured so that when an electronic device scans the pages to create an image, the pages are distinguished from the background external to the page so that the image is substantially of the page, and the images are organized based on at least one of the page identifier and the destination symbol. The method unwarps the image. The method also enhances the image. The image is then forwarded to the destination associated with the marked destination symbol.

In some embodiments, the folio identifier representation is detected and decoded to provide a page identifier for the page. The page identifier is used to determine if the image of the page has not been previously captured. If the image has not been previously captured, the image of the page is captured and saved in an image store.

Among other means, the pages may be distinguished from the background external to the page by identifying a page border. The page can be scanned by taking a photograph with a smartphone camera. To provide a better quality image, the flash of the camera may be activated. The background internal to the page on the image may also be removed.

BRIEF DESCRIPTION OF THE DRAWINGS

The foregoing features of embodiments will be more readily understood by reference to the following detailed description, taken with reference to the accompanying drawings, in which:

FIG. 1b schematically shows a note taking page in accordance with the embodiment of FIG. 1a;

FIG. 2a is a block diagram of principal logical flow used with the embodiment of FIG. 1a while scanning one or more pages of the notebook of FIG. 1a;

FIG. 2b is a block diagram providing detailed logical flow for the Interpret page meta-data logic of FIG. 2a;

FIG. 3 is a block diagram providing detailed logical flow for the capture logic 219 of FIG. 2a;

FIG. 4 is a block diagram providing detailed logical flow for the save logic 205 of FIG. 2a;

DETAILED DESCRIPTION OF SPECIFIC EMBODIMENTS

Definitions

As used in this description and the accompanying claims, the following terms shall have the meanings indicated, unless the context otherwise requires:

A "notebook" is a bound set of pages, wherein each page of the set is generally rectangular in shape. A page having rounded corners is "generally rectangular in shape" within the meaning of this definition.

A "border" of a page in a notebook is a generally rectangular-shaped strip of the page that is located proximate to each of the four edges of the page. The color and/or darkness of the border contrasts with the rest of the page color. {see FIGS. 7*a*, 7*b*, 7*c*, and 7*d* for examples}

A "set" has at least one member.

A "folio identifier representation" is a set of symbols that collectively identify a characteristic selected from the group consisting of page number, notebook number, notebook model, and combinations thereof.

To "enhance" an image includes performing at least one function selected from the group consisting of noise filtering, sharpness enhancement, contrast enhancement, color saturation increase High Dynamic Range Imaging, and Super-resolution and combinations thereof.

[HDRI] High Dynamic Range Imaging is a standard set of image enhancement techniques to use multiple camera images to compose a single image of greater dynamic range. https://en.wikipedia.org/wiki/High-dynamic-range_imaging Super-resolution is a standard set of image enhancement techniques that use multiple camera images to compose a single image of greater resolution. https://en.wikipedia.org/wiki/Superresolution A "camera-equipped computing device" is a computing device coupled to a camera, including but not limited to a camera-equipped smartphone, a camera-equipped tablet computer, a desktop computer with a usb-connected camera, and a laptop computer coupled to a camera.

A "computer process" is the performance of a described function in a computer using computer hardware (such as a processor, field-programmable gate array or other electronic combinatorial logic, or similar device), which may be operating under control of software or firmware or a combination of any of these or operating outside control of any of the foregoing. All or part of the described function may be performed by active or passive electronic components, such as transistors or resistors. In using the term "computer process" we do not necessarily require a schedulable entity, or operation of a computer program or a part thereof, although, in some embodiments, a computer process may be implemented by such a schedulable entity, or operation of a computer program or a part thereof. Furthermore, unless the context otherwise requires, a "process" may be implemented using more than one processor or more than one (single- or multi-processor) computer.

Figure 1A:
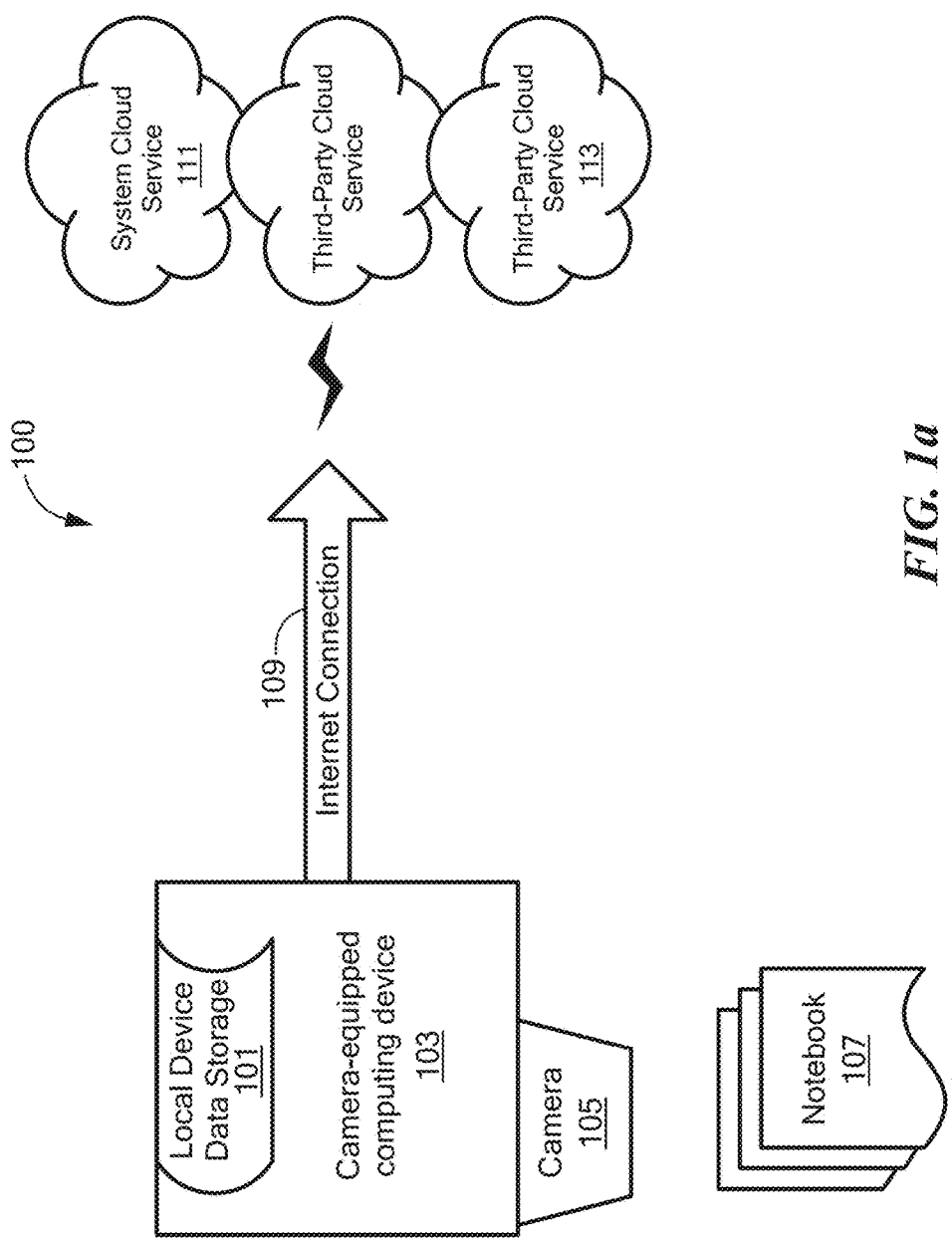
FIG. 1a is a diagram of a system in accordance with an embodiment of the present invention.

FIG. 1a schematically shows a diagram of a system 100 in accordance with an embodiment of the present invention. The system 100 includes a camera-equipped computing device 103, such as a smartphone having a local data storage 101 and a camera 105. The device 103 is optionally coupled over the internet 109 to a system cloud service 111, and third party cloud services 113. In other embodiments, rather than a network connection through the internet 109 to the cloud service 113, the cloud service 113 is within a local area network, a wide area network, or a virtual network such as a VPN (virtual private network). The system also includes a specially configured notebook 107, which will be described in further detail below.

Figure 1B:
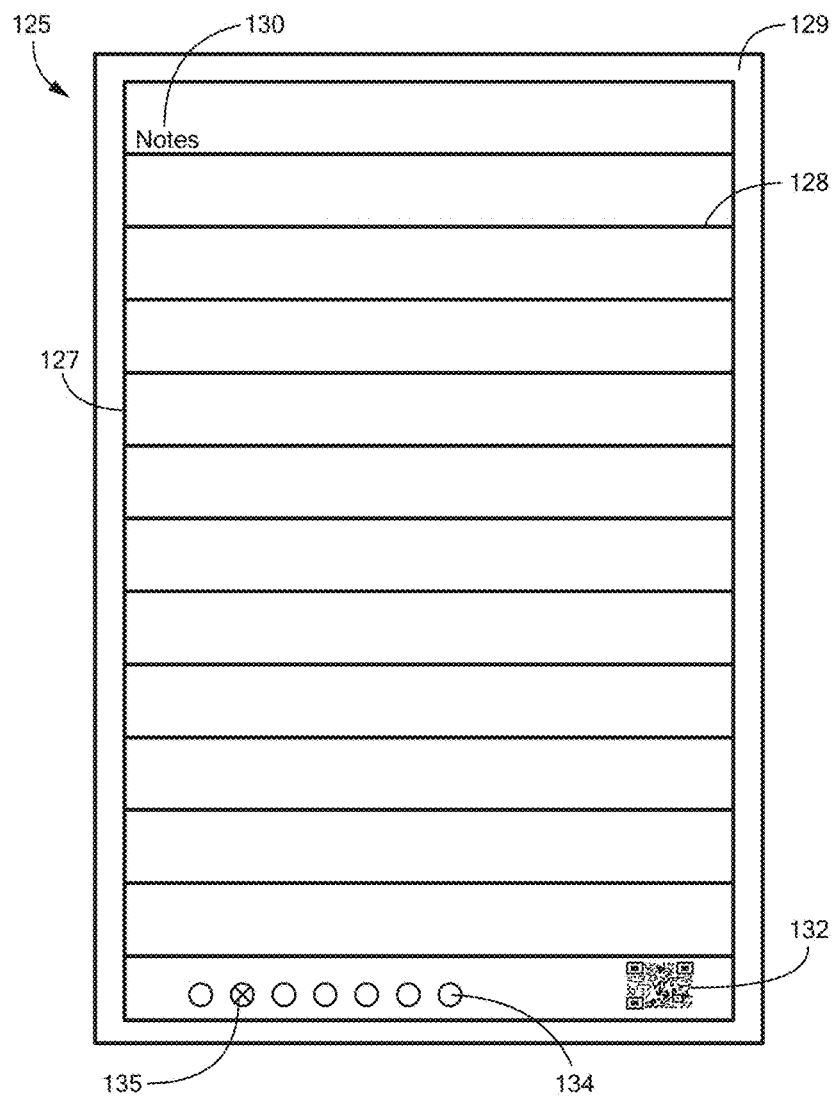

FIG. 1b schematically shows a note taking page 125 of the notebook 107 in accordance with illustrative embodiments of the invention. Like in many notebooks, the pages 125 may have writing lines 128 configured to assist the writer with maintaining spacing and alignment of notes 130. Although shown as horizontal lines, it should be understood that the writing lines 128 may be, for example, dotted lines and/or grid lines that also run vertically (as in graph paper). Alternatively, some embodiments may have no writing lines 128. Additionally, the page 125 may have a border 129. As described later, the border 129 may assist with distinguishing a quadrangle 127 formed by the page 125 from the background. To that end, it is not necessary that the border 129 be continuous. However, illustrative embodiments may have a continuous border 129.

As is explained in further detail below, in some embodiments, the page 125 may also have a folio identifier representation 132 (also referred to as folio identifier 132). The folio identifier 132 may be, for example, a bar code 132 or a quick response code 132 ("QR code"). The folio identifier 132 provides quick identification of the sequence of the pages 125 within the notebook 107. This allows a user to scan/take pictures of the pages 125 in the notebook 107 out of order, and logic within an application may organize the pages 125 in correct sequential order (using the folio identifier 132). Additionally, or alternatively, the user may select one or more destination symbols 134. FIG. 1b illustratively shows seven different destination symbols 134 running along the bottom side of the page 125. It should be understood that illustrative embodiments may provide a number of destination symbols 134 different from what is shown in the figure. The user may sync each destination symbol 134 to a different, or the same, destination (e.g., email address, Google drive, Dropbox, Evernote). After the destination symbol 134 has been selected (e.g., by destination marking 135), the notes 130 are scanned and may automatically be organized by destination and forwarded to the selection destination. Further details are discussed below.

Figure 2A:
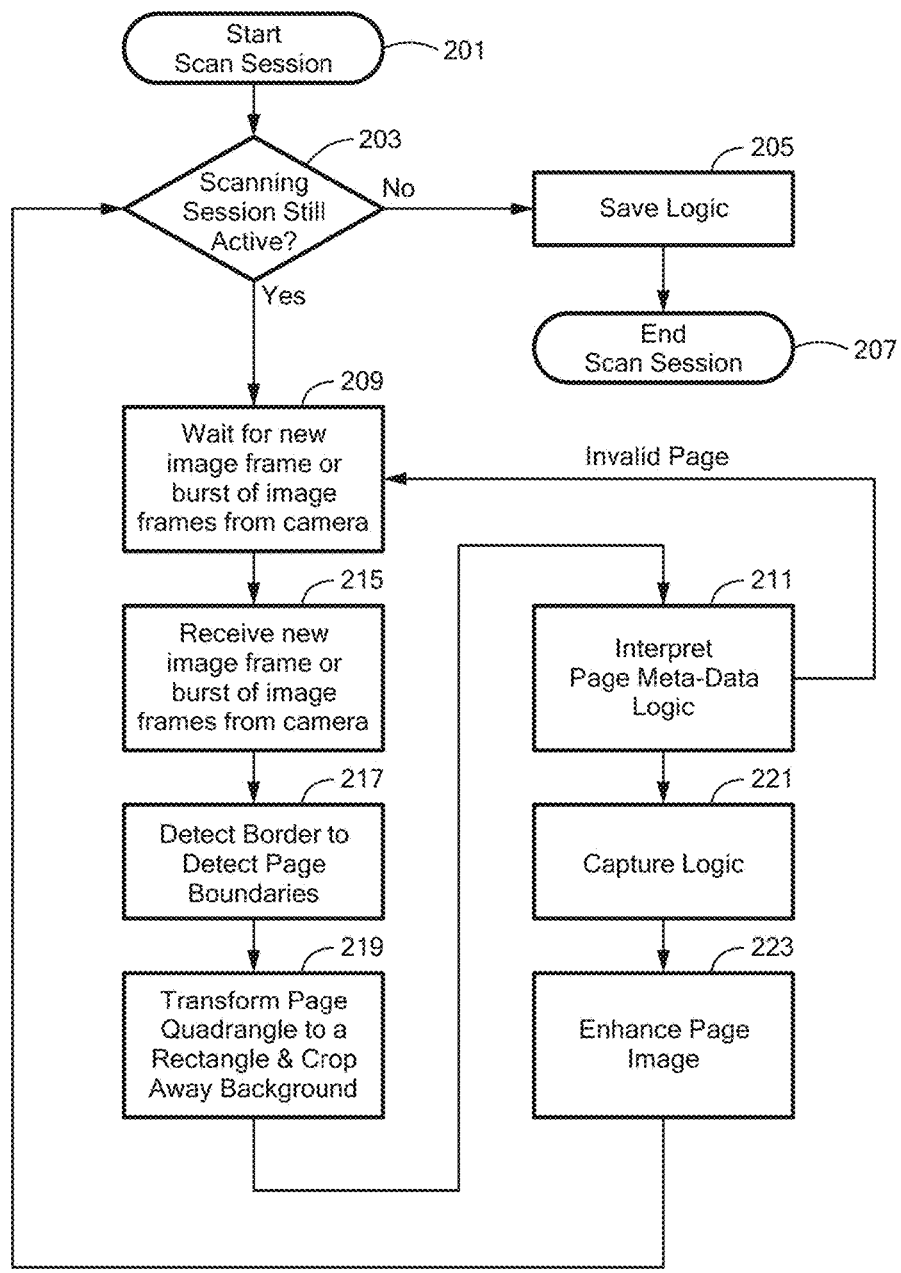

FIG. 2a is a block diagram of principal logical flow used with the embodiment of FIG. 1a while scanning one or more pages 125 of the notebook 107 of FIG. 1a. For example, an application on the camera-equipped computing device 103 may be launched for scanning handwritten notes 130 in the notebook 107. The user may begin or continue a scan session by launching the application. Additionally, launching the application may cause the flash of the device 103 to activate to provide better quality images. Referring to FIG. 2a, in process 201, the user initiates a scan session that is subject to decision process 203 that determines whether the scan session is still active. If the scan session is not active, then the processing goes to save logic 205, and thereafter in process 207, the session is ended. Otherwise, if the scan session is active, a series of steps scans pages 125 automatically as the user presents, in succession, a page 125 or two pages 125 at a time to the camera 105. While discussion refers to "scanning" images, it should be understood that taking a picture is also considered to be "scanning" within illustrative embodiments of the invention.

In a process 209, the application waits for a new image frame or multiple image frames (burst) to be received from the camera 105 for processing. In a process 215, the application receives data for a new image frame or burst of image frames from the camera 105, and then, in a process 217, the application applies standard computer vision techniques (such as quadrangle detection or template matching) to detect the page 125 and its boundaries from the captured data. The page 125, being a generally rectangular piece of paper in the physical world, will appear as a quadrangle 127 in the frame image captured by the camera 105, depending on the relative angle of the camera 105 to the piece of paper 125. The process may detect one or more quadrangles 127 depending on the position of the camera 105 and whether one or two pages 125 of the notebook 107 have been scanned within the captured frame. Accordingly, in process 219, the application applies standard computer vision transformation to unwarp each quadrangle 127 into a rectangle and to remove the background of the image so that it is cropped to the page 125 boundary. In some embodiments, the background of the image may be external to the border of the notebook 107 and/or on the page 125. Background on the page may be, for example, writing lines 128 within the pages 125 of the notebook 107 and/or the color of the page 125 itself. In some embodiments, destination symbols 134 and/or destination markings 135 may also be cropped out of the image. The program flow then goes to the Interpret Page Meta-Data Logic 211, which is described in further detail in FIG. 2b, and thereafter program flow goes to a capture logic 221 (in FIG. 2a). FIG. 3 provides a more detailed description of the capture logic 221. Thereafter, in process 223, the page 125 image is enhanced using conventional image enhancement and filtering techniques, such as, for example, noise filtering, sharpness enhancement, contrast enhancement, color saturation increase, etc.

Figure 2B:
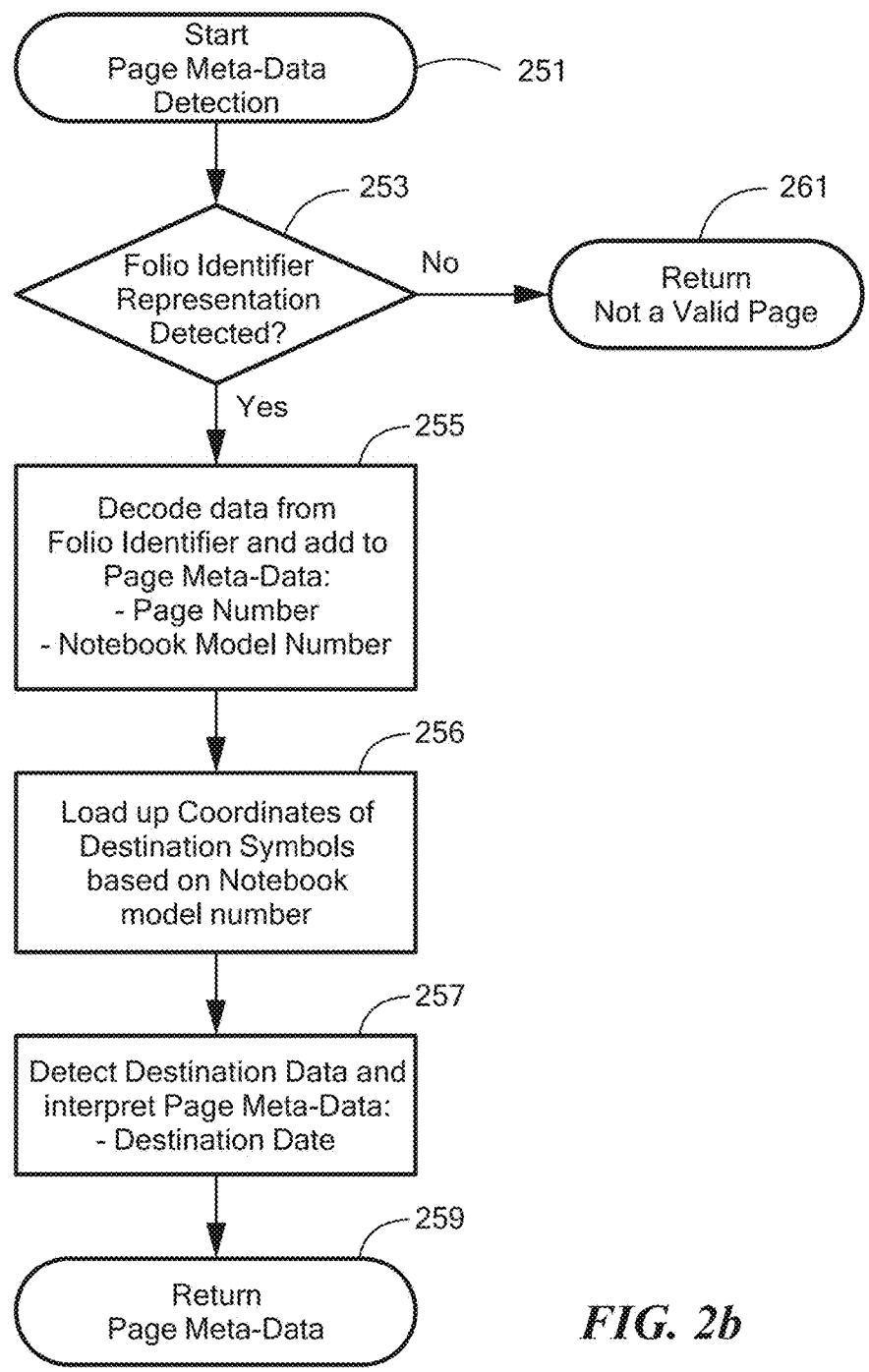
Figure 3:
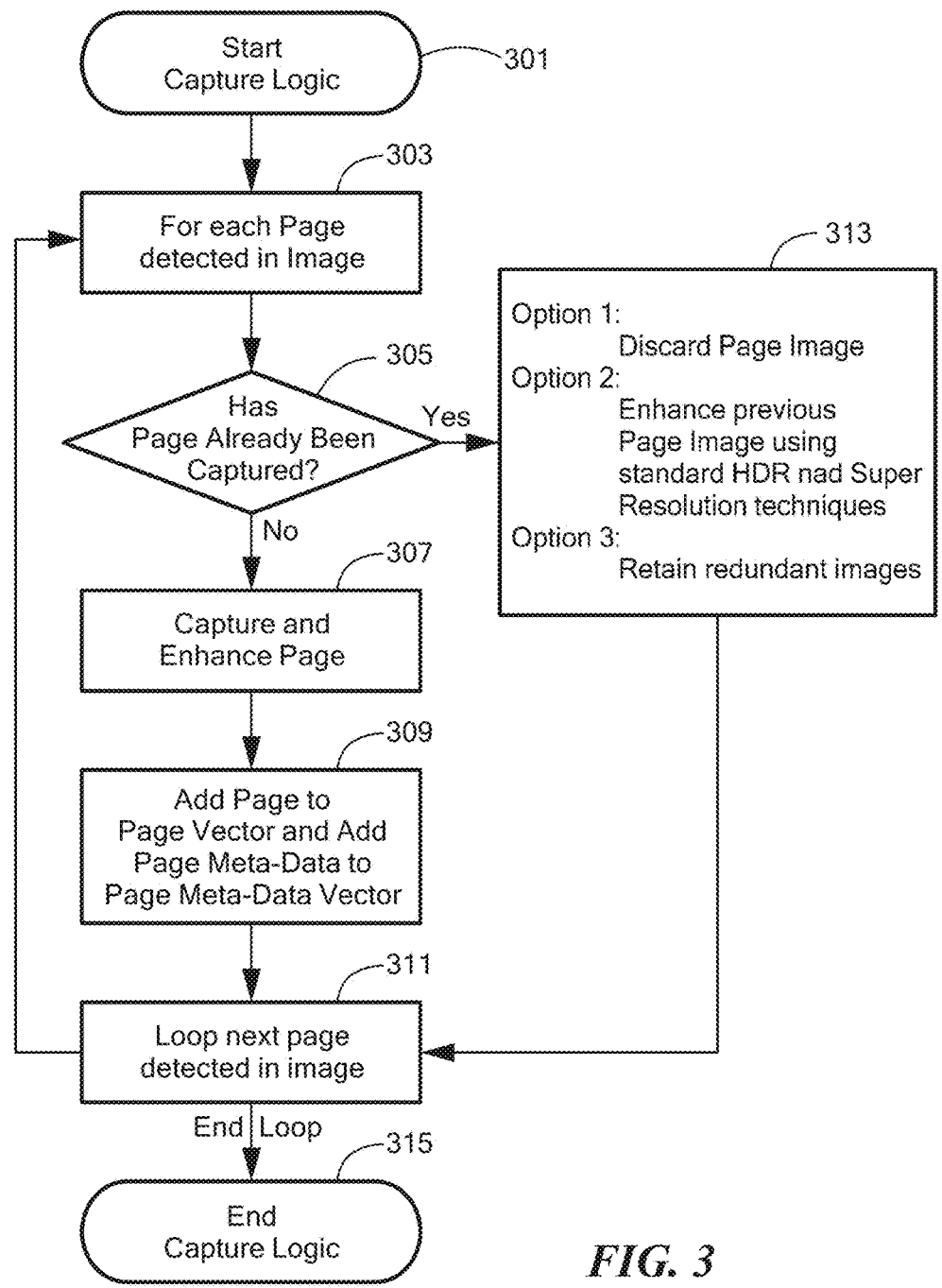

FIG. 2b is block diagram providing detailed logical flow for the Interpret Page Meta-Data Logic 211 of FIG. 2a. In decision process 253, the application determines whether the folio identifier representation 132 is present within the captured data for a given identified quadrangle 127. If not, in some embodiments, there may be returned a "not a valid page" signal in process 261, and logical flow reverts to process 209 of FIG. 2a. In some other embodiments, the page 125 may be stored without the folio identifier 132. For example, in some embodiments, notes 130 from pages 125 without a folio identifier representation 132 and/or from a whiteboard may be incorporated as images into the set of notes. In some embodiments, the user may identify and/or create the folio identifier representation 132 within the application. For example, if the user scans an image of the whiteboard, he may create/select the folio identifier representation 132 on the application and organize the image with respect to the pages 125. Additionally, the user may also select destination symbols 134 for the whiteboard and/or pages without a folio identifier representation 132 within the application. However, if the folio identifier representation 132 is present, then in process 255, the meta-data contained in the folio identifier representation 132 is decoded, including, for example, page number and notebook model number.

In process 256, the notebook 107 model number may be used to access a lookup table having the coordinates of the destination symbols 134 on the page 125. For example, the notebook 107 model number may be associated with a specified page 125 size and aspect ratio wherein for a given rectangle an expected location for the destination symbol 134 can be determined. Although described above as being along the bottom of the page 125, the destination symbols 134 may be placed anywhere on the page 125. The notebook 107 model number helps identify the expected coordinates of the destination symbols 134. In some embodiments, some or all of the destination symbols 134 may be selected in the application, indicating that the notes are to be synced with the respective selected destinations. Then in a process 257, the fetched coordinates are used to determine the type of marking 135 (general marking, continuation marking, or no marking) on each of the destination symbols 134. As part of the same process, based on the determined markings 135, the application sets values for destination data in the page meta-data.

FIG. 3 is a block diagram providing detailed logical flow for the capture logic 221 of FIG. 2a. Process 303 is the beginning of a loop used for each page 125 detected in the image. In process 305, the application determines if the page 125 has already been captured. This determination may be performed by a number of different techniques including use of the folio identifier representation 132, which may indicate a page number, wherein the logic 221 would compare the folio identifier representation 132 for stored data (pages) with the current folio identifier representation 132 in order to eliminate duplication. The stored page data may also be directly compared with the data for the current page 125 to determine if the data is already stored in memory (e.g., is redundant). If the page 125 has already been captured, then three options are posed in process 313, depending on the embodiment selected. In one embodiment, the page 125 image is discarded. Alternatively, or additionally, in another embodiment, if the page 125 is being captured again, in process 313, the redundant image of the page 125, along with previously captured images of the page 125, is used to prepare a composite further enhanced image of the page 125 using standard multi-image enhancement techniques such as HDRI and super-resolution. In either embodiment, logical flow proceeds to process 311, which is described below as at the close of the loop begun in process 303. In another embodiment, all of the redundant images are retained.

Returning to step 305, if the page 125 has not yet been captured, then in process 307 the page 125 is captured and enhanced. Next, in process 309, the page 125 is added to the Page Vector. In process 311, the loop begins if there are more pages 125 detected in the image, or, otherwise ends the capture logic 221 in process 315.

Figure 4:
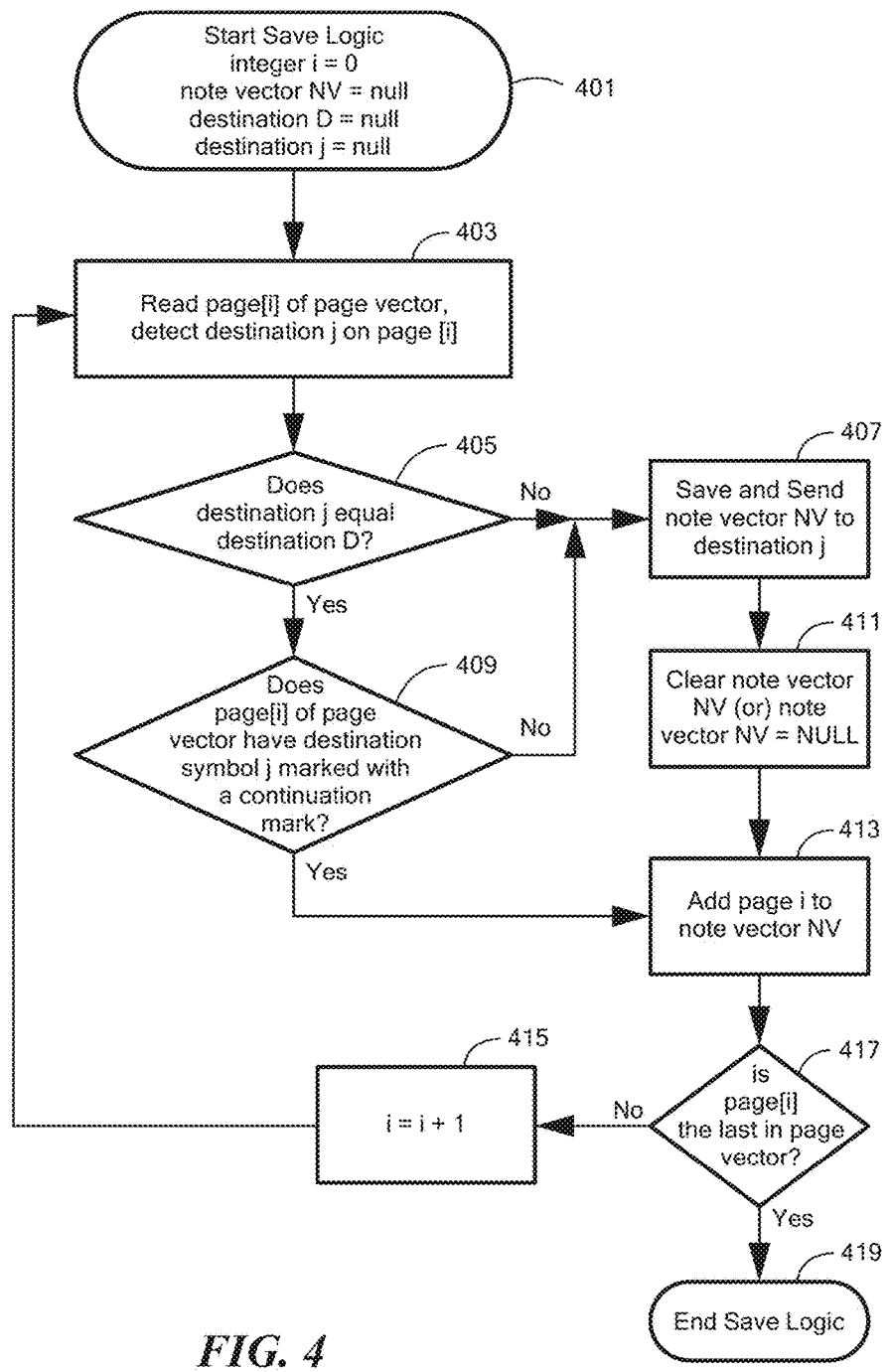

FIG. 4 is a block diagram providing detailed logical flow for the save logic 205 of FIG. 2a. Process 401 initiates the logical flow, by initializing variables as follows: integer i is initialized to 0; a vector of note images NV is initialized as an empty vector; destination D is set to no destination; and destination j is set to no destination. Process 403 begins a loop, which loops for each page 125 in the current page vector NV. The pages 125 in the current page vector NV are determined by the capture logic 221 logical flow contained in FIG. 3, prior to initiating the save logic 205. Process 403 also detects which destination symbols 134 are marked on the page 125, and sets destination j equal to the destination assigned to the destination symbol(s) 134. Process 405 compares destination D to destination j, and if they are equal, proceeds to process 409, and if not proceeds to process 407. Process 409 detects if the destination symbol 134 is marked with a continuation mark, and if so proceeds to process 413, and if not proceeds to process 407. Process 407 saves the note vector NV and sends it to destination j if NV is non-empty. Process 411 clears NV so that NV is equal to a null vector. Process 413 adds page[i] of the page vector to the note vector NV. Process 417 checks if page[i] of the note vector is the last item in the page vector, and if so proceeds to process 419 and if not proceeds to process 415. Process 415 increments the integer i by one, and proceeds to the beginning of process 403 to commence another loop in the save logic 205. Process 419 ends the save logic 205.

Figure 5A:
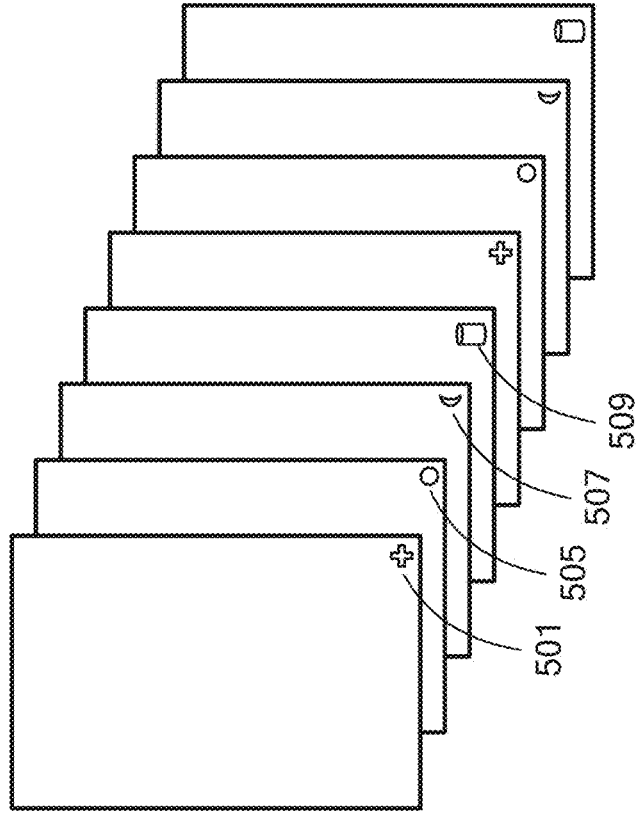
FIG. 5a schematically shows a folio identifier representation, in accordance with an embodiment of the present invention, for use with the notebook in the embodiment of FIG. 1, by which the representation uses a set of at least four distinct symbols.

FIG. 5a shows an example of the folio identifier representation 132 on pages 125 of the notebook 107, in accordance with an embodiment of the present invention. The folio identifier representation 132 is used with the notebook 107 shown in the embodiment of FIG. 1a, by which the representation uses a set of at least four distinct symbols (501, 505, 507, 509) and each of the distinct symbols 501, 505, 507, 509 may represent one or more parameter values (e.g. page number, notebook type, aspect ratio, serial number of the notebook etc.). The user can flip through a sequence of notebook pages 125, presenting the pages 125 one or two at a time to the camera 105. The application running on the Camera-equipped computing device 103 can, in process 305 of FIG. 3, apply simple logic to prevent the redundant capture of an identical page 125.

In some embodiments, if the process captures the page 125 with symbol 'i', the process determines that following page images containing symbol 'i'' have already captured, until the cycle is complete. Once the process has detected two pages 125 that do not have symbol i, or two image frames, each with a distinct page 125 that does not have symbol i, then the cycle is considered complete for symbol i. Then, when the next image is detected to have the page 125 that contains symbol i, it can determine that the page 125 is a new page 125, and has not already have been captured. In other words, in some embodiments, the capture of an image with a symbol other than 'i' would indicate that subsequent 'i's are different pages 125. As shown in FIG. 5a, the four symbols 501, 505, 507, 509 would be repeated on the next set of four pages 125 of the notebook 107.

Figure 5B:
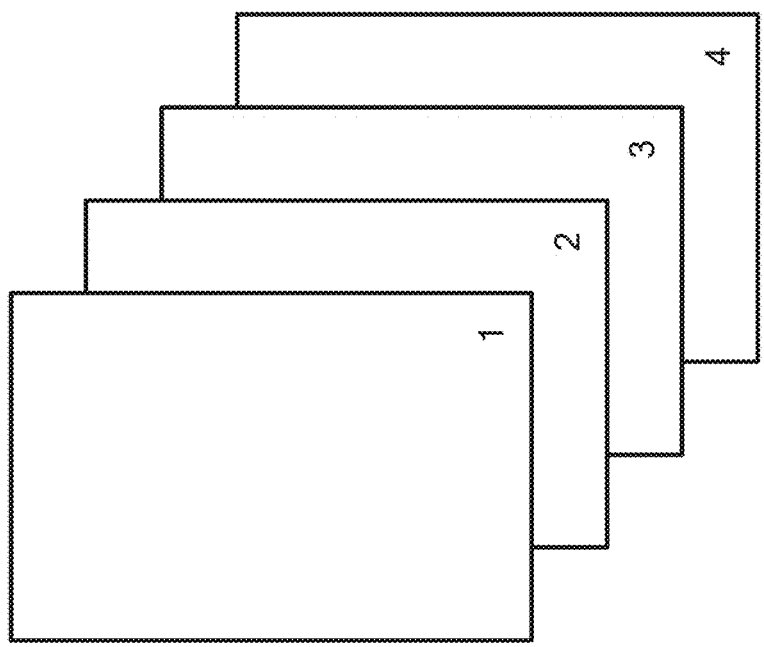
FIG. 5*b* schematically shows another folio identifier representation, in accordance with an embodiment of the present invention, for use with the notebook in the embodiment of FIG. 1*a*, by which the representation uses a set of at least four distinct numbers.

FIG. 5b shows an example of another folio identifier representation 132 on pages of a notebook 107, in accordance with an embodiment of the present invention, for use with the notebook 107 in the embodiment of FIG. 1a, by which the representation 132 uses a set of at least four distinct numbers 501, 505, 507, 509. In some embodiments, the number may repeat. Alternatively, in some other embodiments, the numbers may be sequential. The user may manually delete individual images in the application after they are organized.

Figure 6B:
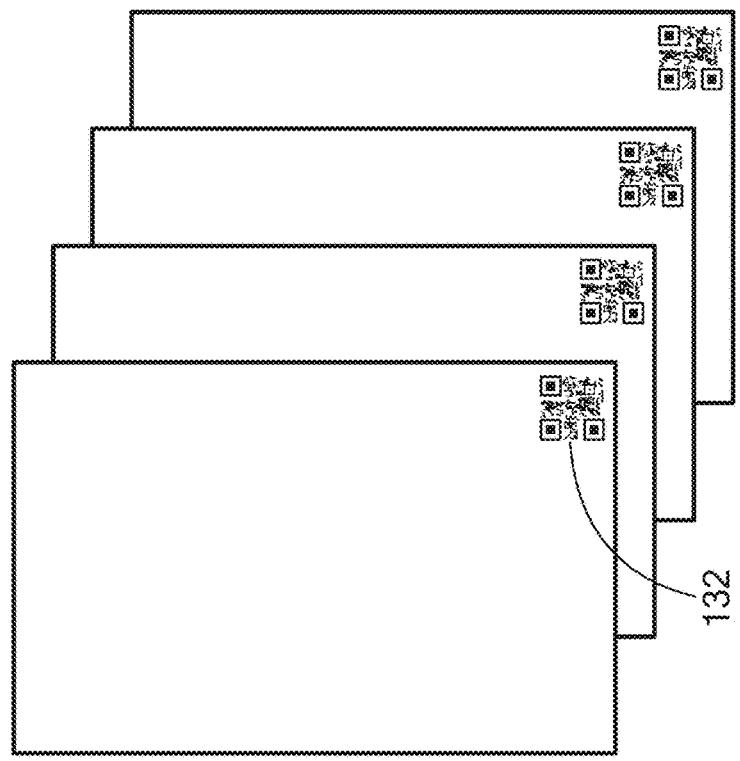
FIG. 6*b* schematically shows another folio identifier representation, in accordance with an embodiment of the present invention, for use with the notebook in the embodiment of FIG. 1*a*, by which the representation uses one QR code that encodes page and other data for each page.
Figure 6A:
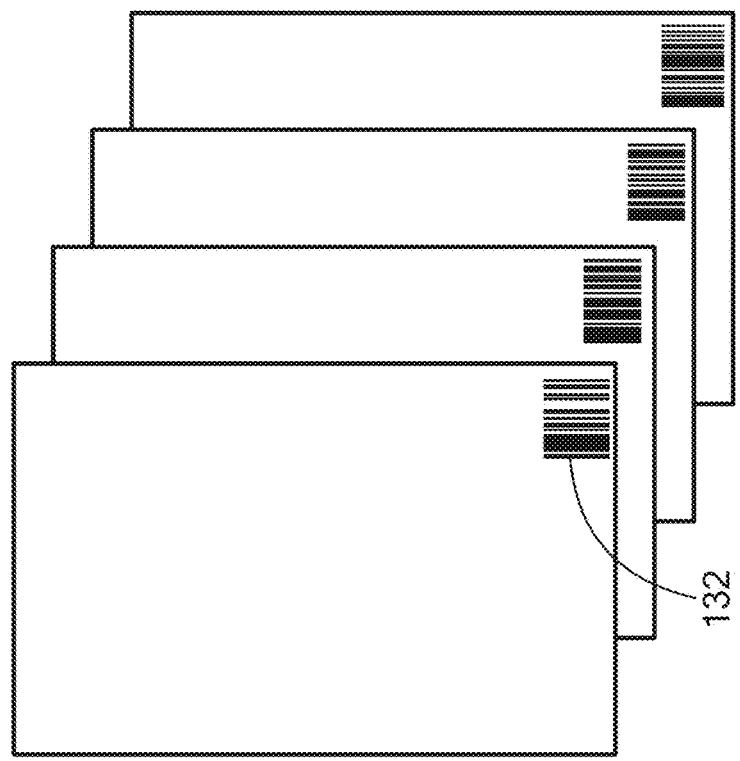
FIG. 6*a* schematically shows another folio identifier representation, in accordance with an embodiment of the present invention, for use with the notebook in the embodiment of FIG. 1*a*, by which the representation uses one bar code that encodes page and other data for each page.

FIG. 6a shows an example of another folio identifier representation 132 on pages 125 of the notebook 107, in accordance with an embodiment of the present invention, for use with the notebook 107 in the embodiment of FIG. 1, by which the representation 132 uses one bar code on each page 125 that encodes page 125 and other data folio identification 132. As shown, the folio identifier representation 132 may be a bar code 132. Each unique bar code may have one or more parameters associated with the bar code (i.e. the folio identifier representation 132).

FIG. 6b shows an example of another folio identifier representation 132 on pages of the notebook 107, in accordance with an embodiment of the present invention, for use with the notebook 107 in the embodiment of FIG. 1a, which the representation 132 uses one QR code 132 on each page 125 that encodes the page 125 and other data that comprises the folio identification 132, which can include the model number of the notebook 107 and an individual serial number for each notebook 107.

The above described folio identifier representation 132 allows the application to automatically order pages 125 correctly after pages are scanned out of order. In some embodiments, the user can adjust the page 125 order after it has been automatically organized by the application. Additionally, the user may select individual images and send them to various destinations.

Figure 7B:
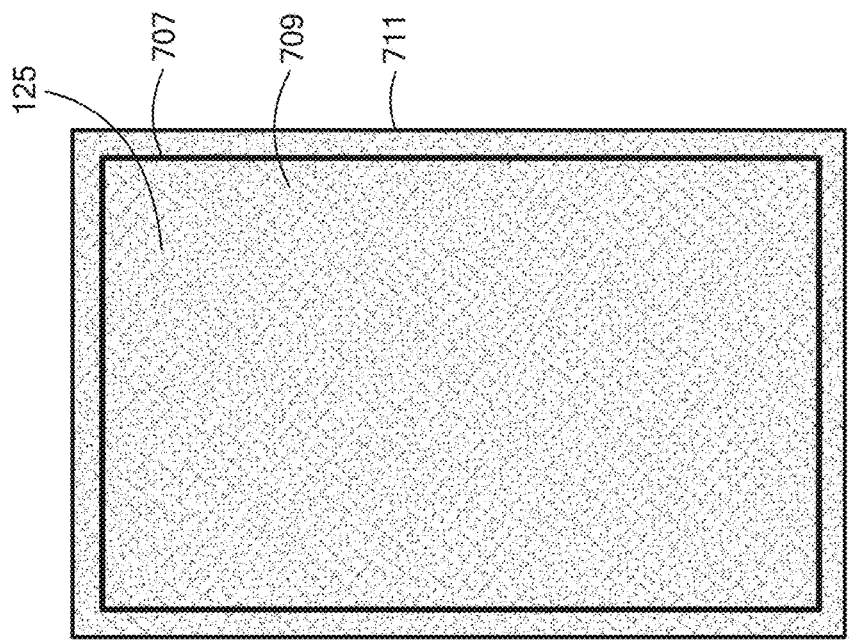
FIG. 7*b* schematically shows a representation of a notebook page, in an embodiment for use with the notebook in the embodiment of FIG. 1*a*, employing a border to facilitate identification of the boundary of the page, wherein the border near to, but not coincident with, the edge of the page is darker than the background of the page.
Figure 7A:
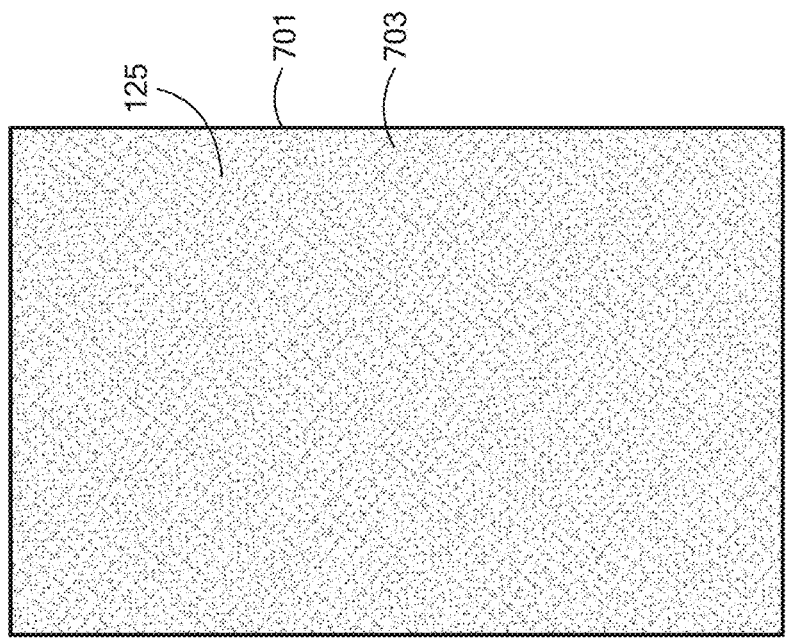
FIG. 7*a* schematically shows a representation of a notebook page, in an embodiment for use with the notebook in the embodiment of FIG. 1*a*, employing a border to facilitate identification of the boundary of the page, wherein the border coincides with the edge of the page and is darker than the background of the page.

FIG. 7a is an exemplary representation of the notebook page 125, in an embodiment for use with the notebook 107 in the embodiment of FIG. 1a, employing a border 701 to facilitate identification of the boundary of the page 125, wherein the border 701 coincides with the edge of the page 125 and is darker than the background 703 of the page 125. It should be recognized by one of ordinary skill in the art that the border 701 and the background external to the page 125 contrast enough so as to be discernable by an image sensor of a camera 105.

FIG. 7b is a another exemplary representation of the notebook page 125, in an embodiment for use with the notebook 107 in the embodiment of FIG. 1a, employing a border 707 to facilitate identification of the boundary of the page 125, wherein the border 707 near, but not coincident with, the edge 711 of the page 125 and is darker than the background 709 of the page 125. Again, the border 707 and the background 709 must contrast enough, so as to be discernable as different colors/shades of gray by an image sensor of a camera 105. Preferably, the border 707 and the background 709 contrast by a predefined number of levels. For example, by at least 25 levels of 256 levels of grey or by 25 levels for one or more color channels.

Figure 7D:
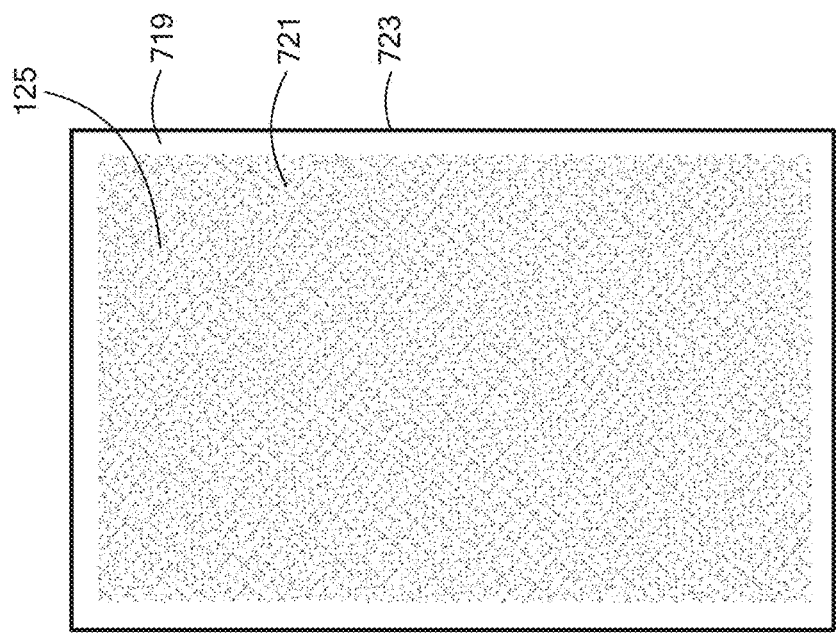
FIG. 7*d* schematically shows a representation of a notebook page, in an embodiment for use with the notebook in the embodiment of FIG. 1*a*, employing a border to facilitate identification of the boundary of the page, wherein the border is near to, but not coincident with, the edge of the page is lighter than the page.
Figure 7C:
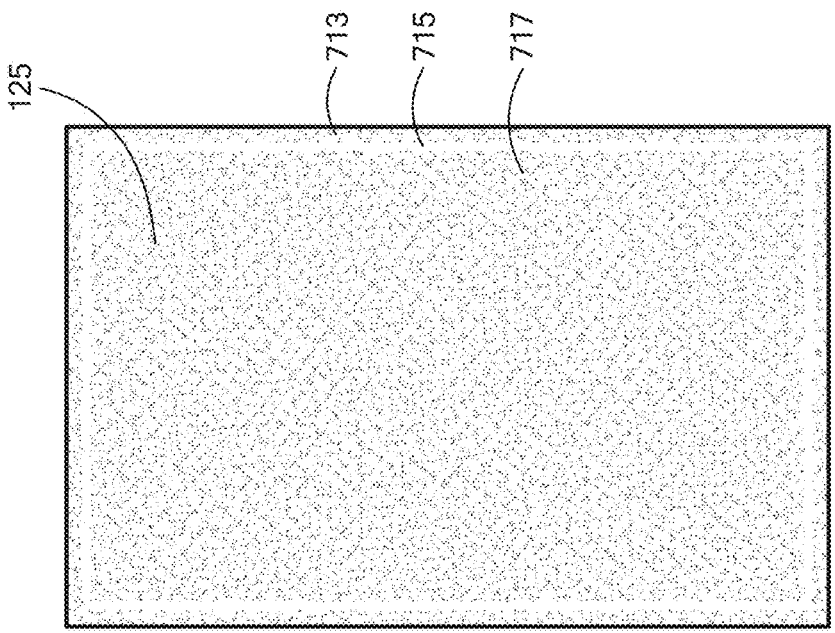
FIG. 7*c* schematically shows a representation of a notebook page, in an embodiment for use with the notebook in the embodiment of FIG. 1*a*, employing a border to facilitate identification of the boundary of the page, wherein the border coincides with the edge of the page and is lighter than the page.

FIG. 7c is an exemplary representation of the notebook page 125, in an embodiment for use with the notebook 107 in the embodiment of FIG. 1a, employing a border 715 to facilitate identification of the boundary of the page, wherein the border 715 near to, but not coincident with, the edge 713 of the page and is lighter than the background 717 of the page.

FIG. 7d is an exemplary representation of the notebook page 125, in an embodiment for use with the notebook 107 in the embodiment of FIG. 1a, employing a border 719 to facilitate identification of the boundary of the page 125, wherein the border 719 coincides with the edge 723 of the page 125 and is lighter than the background 721 of the page 125.

Figure 8:
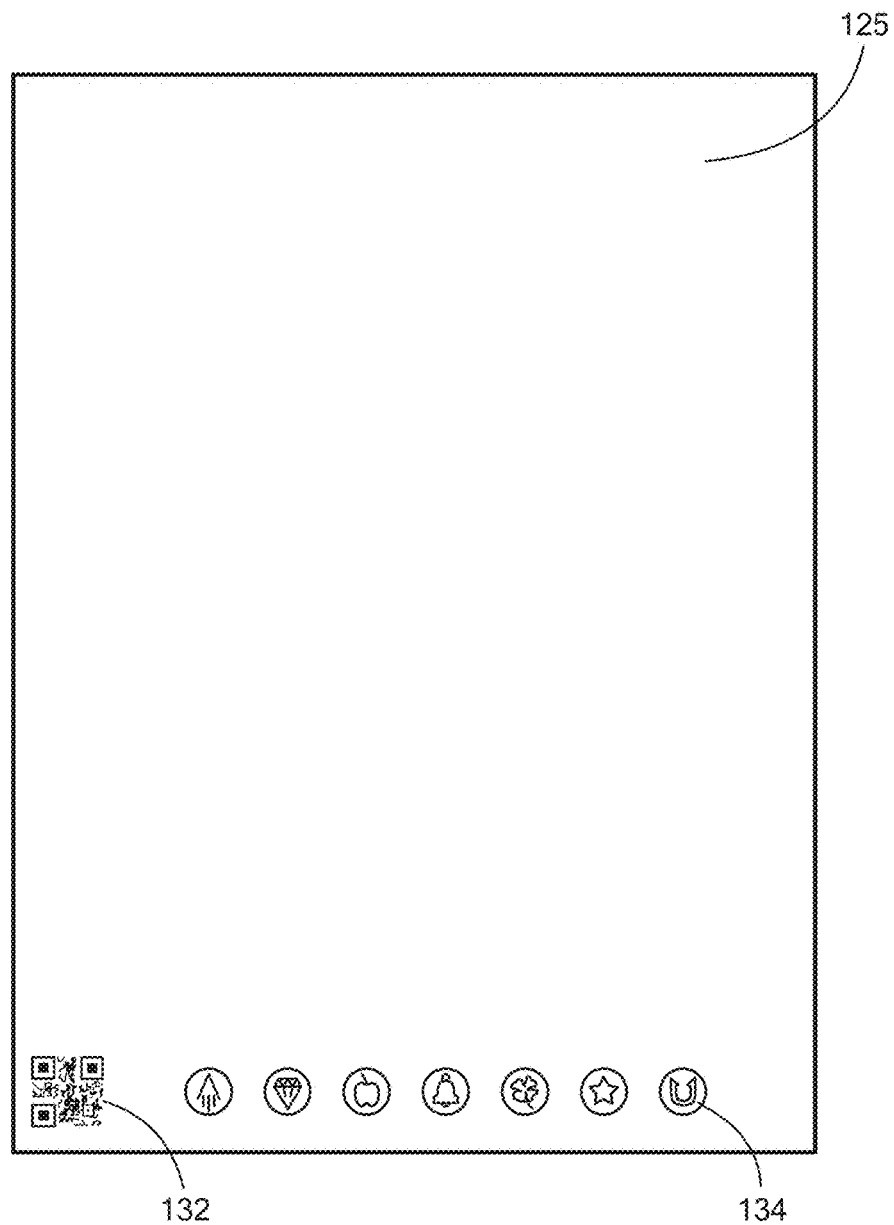
FIG. 8 schematically shows a representation of a notebook page, in an embodiment for use with the notebook in the embodiment of FIG. 1*a*, provided with a set of destination symbols to allow the user to specify one or more destinations to which the note set containing the relevant page will be sent.

FIG. 8 is a representation of the notebook page 125, in an embodiment for use with the notebook 107 in the embodiment of FIG. 1a, provided with a set of destination symbols 134 to allow the user to mark a symbol 134 to specify one or more destinations to which the set of notes containing the relevant page 125 will be sent. For example, the destination may be associated with an address, such as a location associated with a user account for a web service. The destination may be predetermined or defined by the user, wherein the symbols 134 will be associated initially with a default destination, which can be customized by the user within the application. The user may view the image of the page 125 and the associate destination and make manual adjustments to the destination (e.g., by selecting a different destination symbol 134 in the application or inputting an email address manually).

Figure 9:
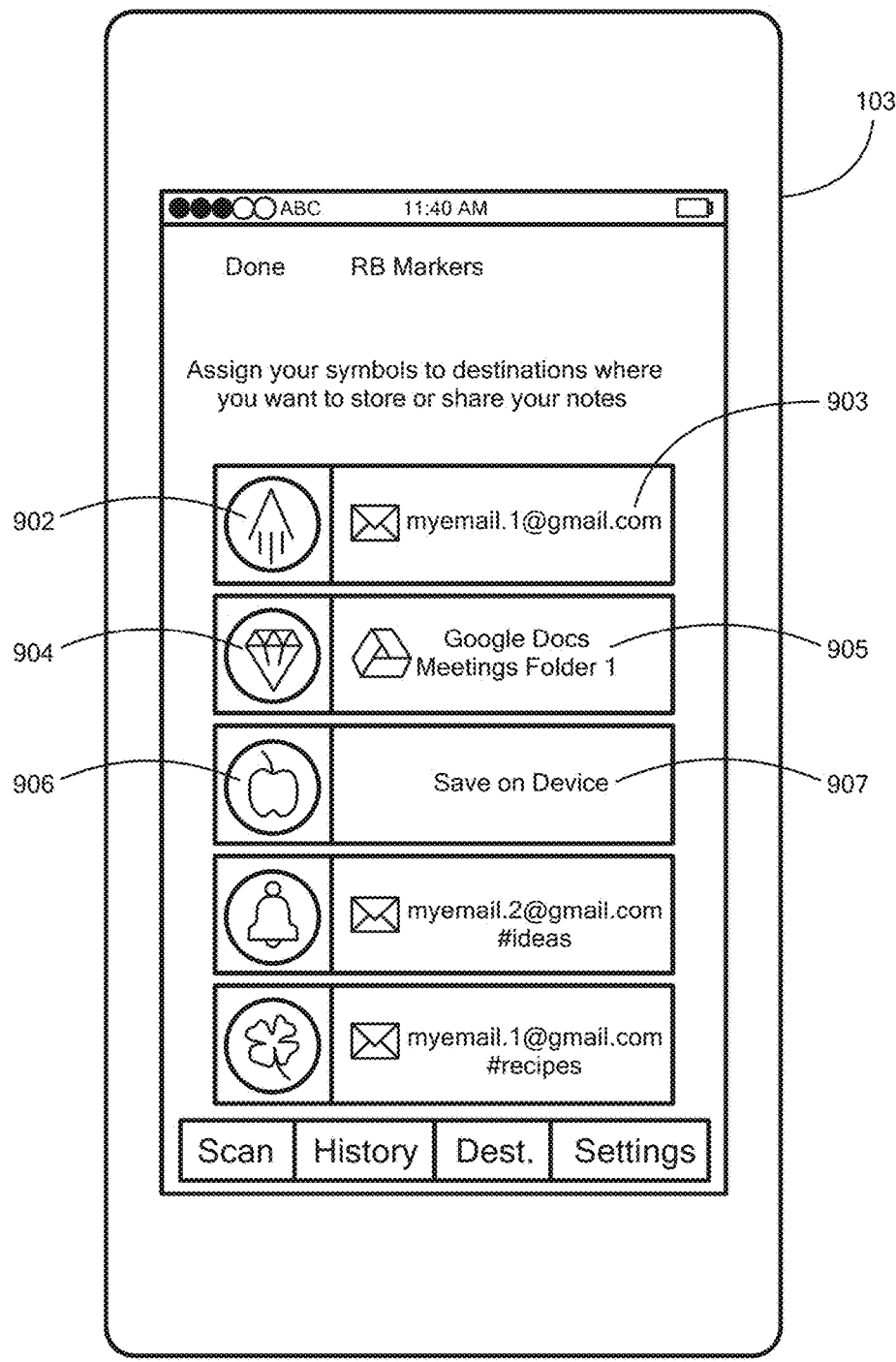
FIG. 9 schematically shows a representation of a display on a smartphone running an application in accordance with the embodiment of FIG. 1*a* by which the user can specify a destination that corresponds to the manner in which the destination symbols of FIG. 8 have been marked.

FIG. 9 is a representation of a display on a smartphone 103 running an application in accordance with the embodiment of FIG. 1a by which the user can specify a destination that corresponds to the manner in which the destination symbols 134 of FIG. 8 have been marked. In the specific configuration illustrated in FIG. 9, the user has configured a rocket symbol 902 to route to an email address 903 myemail.1@gmail.com, configured a diamond symbol 904 to route to their Google docs folder 905 named "Meetings Folder 1," and configured an apple symbol 906 to route to a local storage 907 on the mobile device 103.

Figure 10:
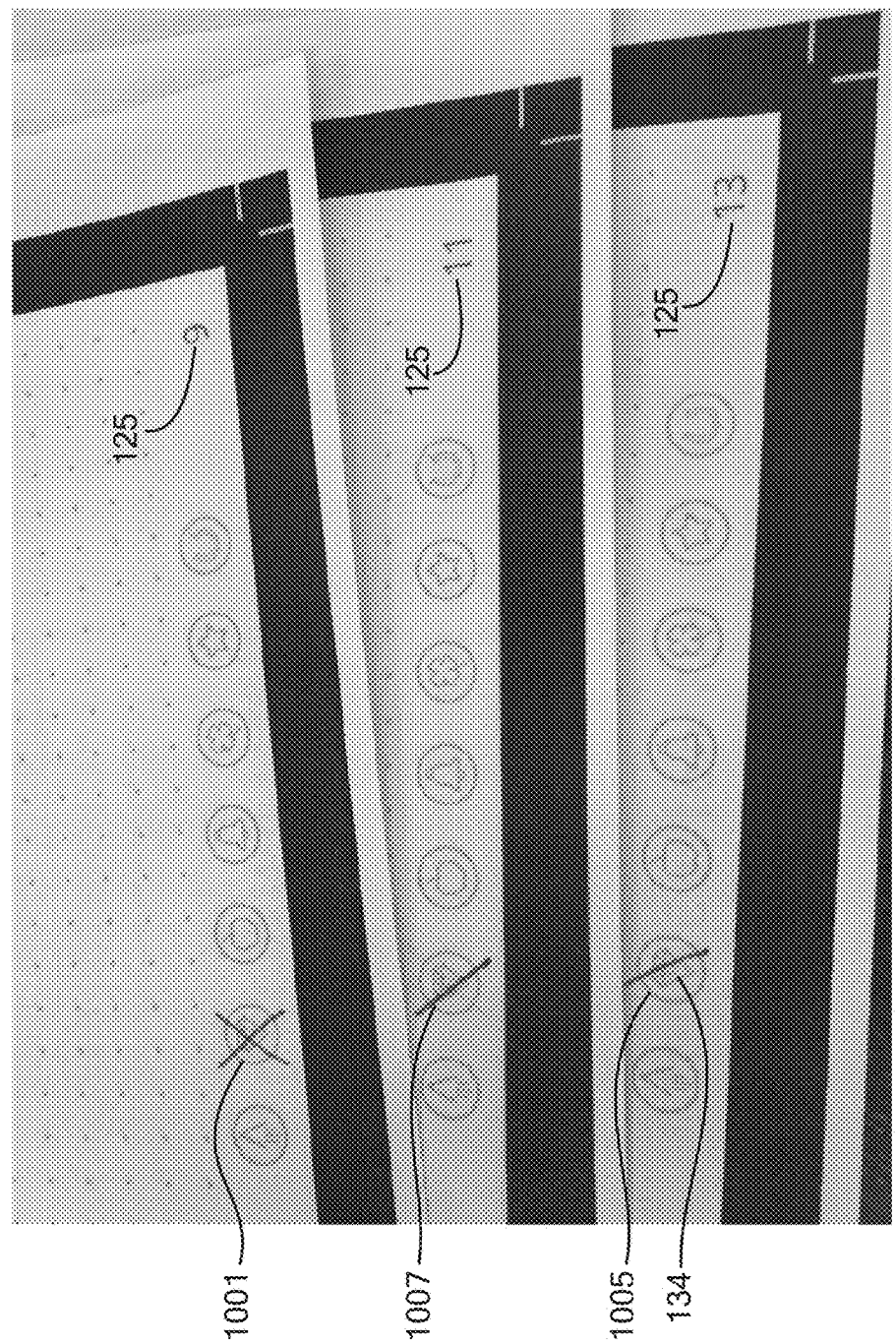
FIG. 10 schematically shows a representation of a set of consecutive notebook pages according to the embodiment of FIG. 8, wherein the pages have been marked by user to be grouped into a note set and sent to a particular destination.

FIG. 10 is a representation of a set of consecutive notebook pages 125 according to the embodiment of FIG. 8, wherein the pages 125 have been marked by the user to be grouped into a note set and sent to the particular destination 1001 (i.e., the destination marked by the diamond destination symbol 134). In the embodiment illustrated by FIG. 10, the three pages 125 of notes will be grouped as the same set of notes, because the user has marked the diamond symbol 134 with a general mark (any mark except the continuation mark) 1001, and has marked the diamond symbol 134 on subsequent pages 125 with the same symbol 1005, 1007, the diamond, but with a continuation mark, which, in this embodiment, is a single line over the symbol. Although continuation marks 1005, 1007 are shown as different from the general mark 1001, in some embodiments, the same mark may be used to group continuation pages.

Figure 11A:
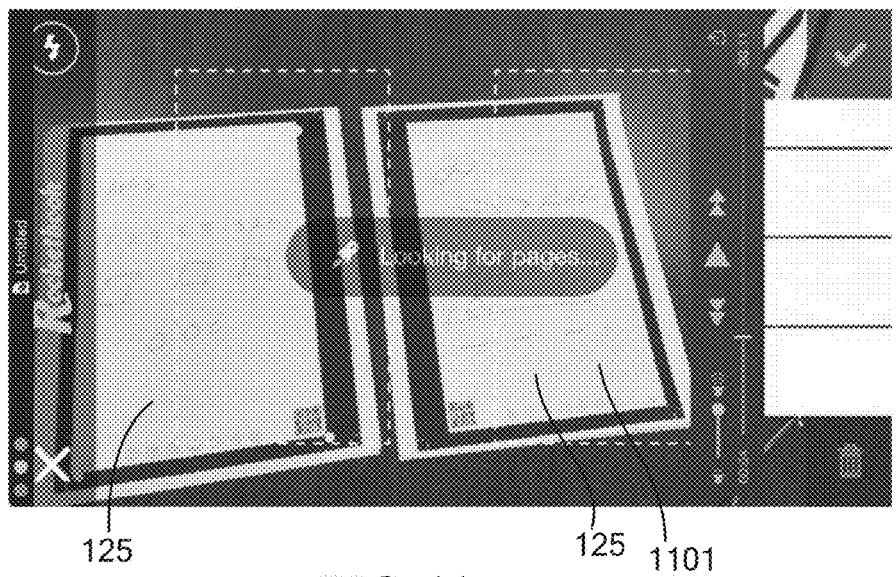
FIG. 11*a* schematically shows a representation of a display of a smartphone running an application in accordance with the embodiment of FIG. 1*a* wherein the camera is aimed at a pair of pages in the notebook but the application processes have not yet identified a page.

FIG. 11a is a representation of a display of on a smartphone 103 running an application in accordance with the embodiment of FIG. 1a wherein the camera 105 is aimed at a pair of pages 125 in the notebook 107 but the application processes have not yet identified a page 1101.

Figure 11B:
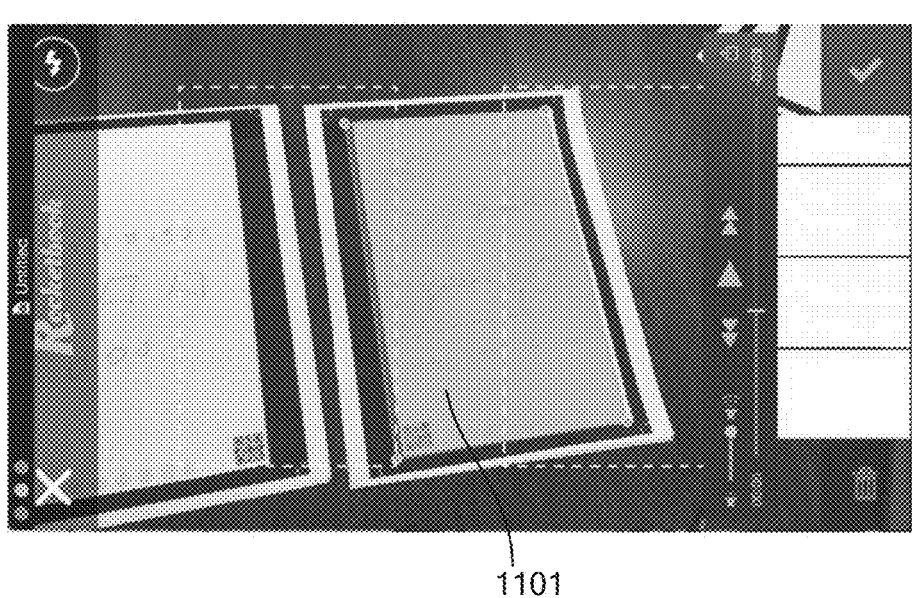
FIG. 11*b* schematically shows a representation of a display of on a smartphone running an application in accordance with the embodiment of FIG. 1*a* wherein the camera is aimed at a pair of pages in the notebook and the application processes have identified a page on the right-hand side and show that page as being captured.

FIG. 11b is a representation of a display of on the smartphone 103 running an application in accordance with the embodiment of FIG. 1a wherein the camera 105 is aimed at a pair of pages 125 in the notebook 107 and the application processes have identified the page 1101 on the right-hand side and showing the page 1101 as being captured. To provide real-time feedback to the user, the user interface, which is a mobile device 103 touch-screen in this embodiment, displays a green overlay over the page being scanned (shown as a darker gray in gray scale).

Figure 11C:
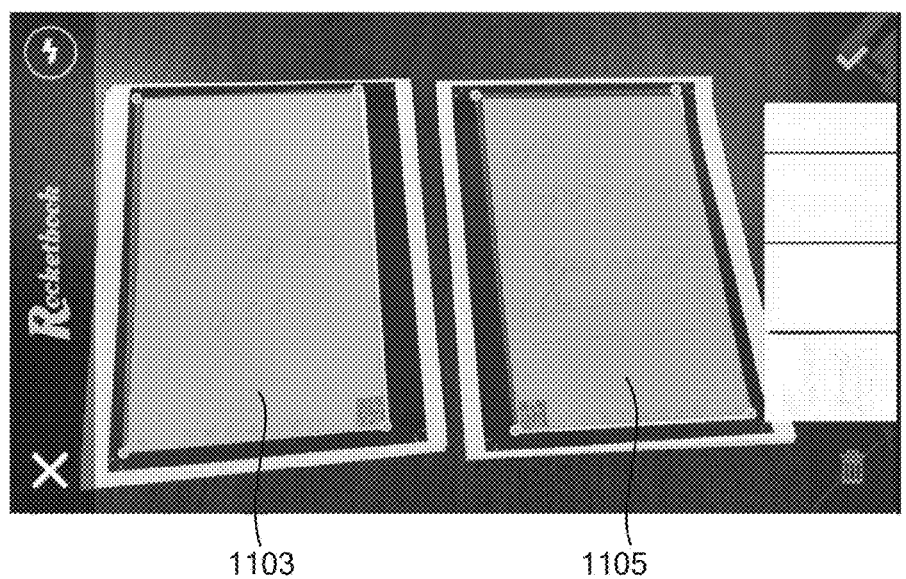
FIG. 11*c* schematically shows a representation of a display on a smartphone running an application in accordance with the embodiment of FIG. 1*a* wherein the camera is aimed at a pair of pages in the notebook and the application processes have identified right-hand and left-hand pages, recognized that the right-hand page has been previously captured and showing the page on the left-hand side as being captured.

FIG. 11c is a representation of a display on the smartphone 103 running an application in accordance with the embodiment of FIG. 1a wherein the camera 105 is aimed at pages 1103 and 1105 in the notebook 107. The application processes have identified right-hand 1105 and left-hand 1103 pages, recognized that the right-hand page 1105 has been previously captured, and shows the left-hand page 1103 as being captured. To provide real-time feedback to the user, the user interface, which is a mobile device 103 touch-screen in this embodiment, displays a colored overlay (e.g. green) over the page 125 being scanned, and a different colored overlay (e.g. gray) over the page that has already been scanned.

Figure 12:
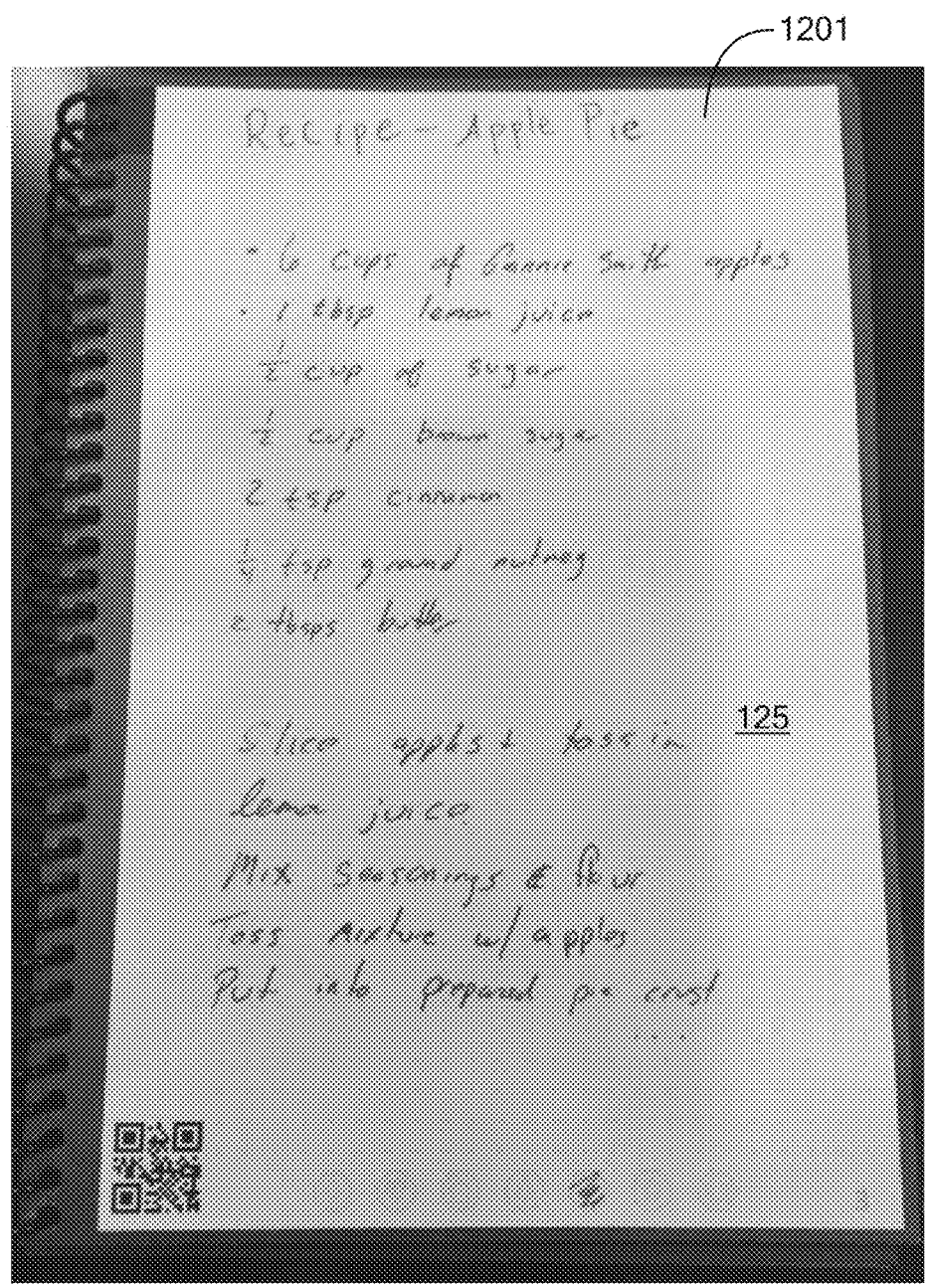
FIG. 12 schematically shows a representation of a page of the notebook in the embodiment of FIG. 1*a*, wherein the user has written a title at the top of the page.

FIG. 12 is a representation of the page 125 of the notebook 107 in the embodiment of FIG. 1a, wherein the user has written a title at the top of the notebook page 125, which reads "Recipe—Apple Pie" 1201. For the notebook 107, a section of the note page 125 may be designated as the title section, and the application will identify and save a copy of the text, in image form or using optical character recognition ("OCR") as text and associate the title 1201 with the saved image. For example, a certain portion, for example, the top 15% of the page 125 may be designated as the title 1201 section.

Figure 13:
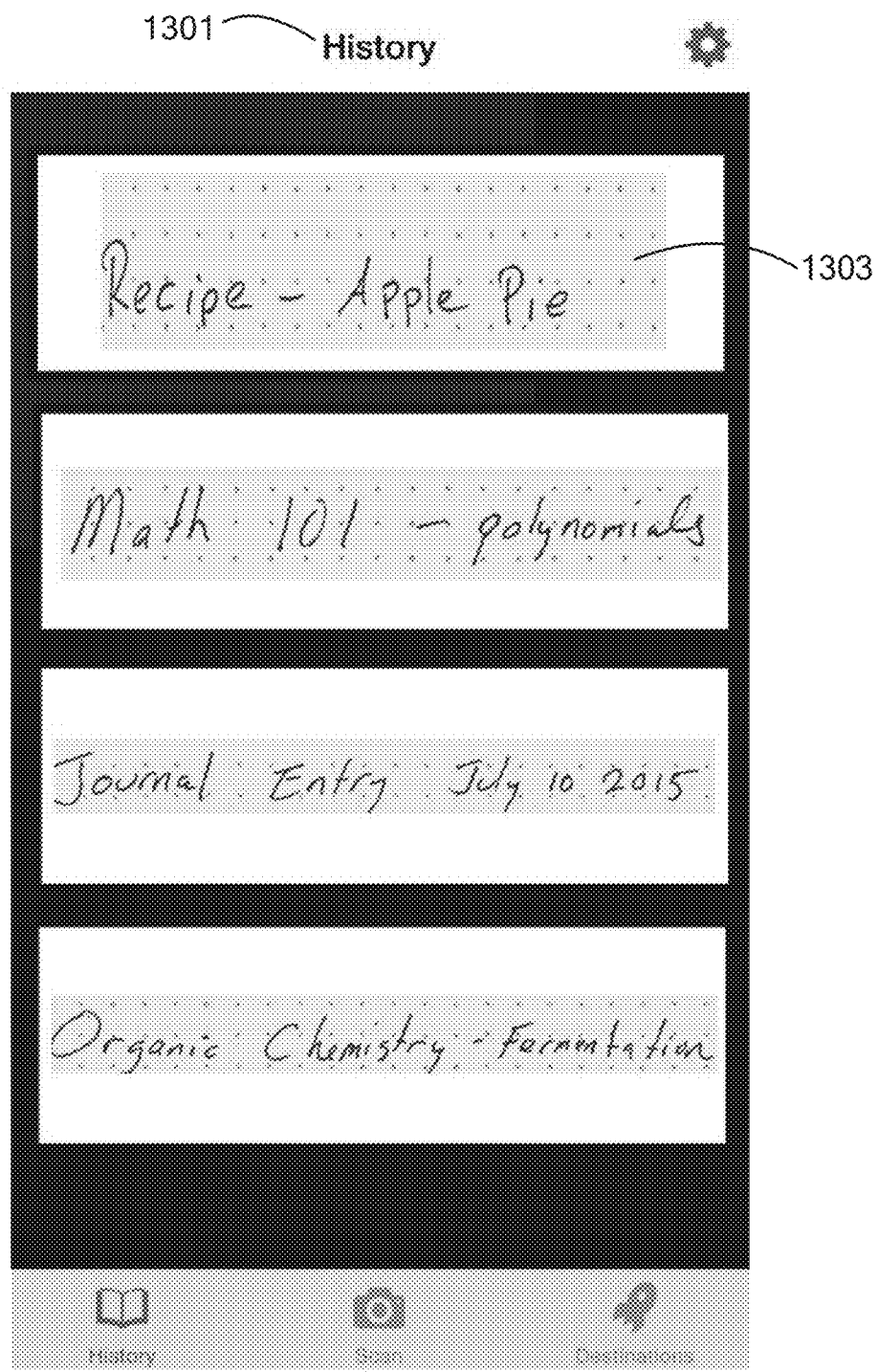
FIG. 13 schematically shows a representation of a display on a smartphone running an application in accordance with the embodiment of FIG. 1*a* showing a history screen of note sets that have been captured wherein each note set is identified by a preview of a user-written title.

FIG. 13 is a representation of a display on the smartphone 103 running an application in accordance with the embodiment of FIG. 1a showing a history screen 1301 of note sets that have been captured wherein each note set is identified by a preview of a user-written title 1303. The first preview on the history screen 1301 is displaying an image of the title 1303 that the user wrote on the page 125 depicted in FIG. 12, which reads, "Recipe —Apple Pie" 1303. By displaying the title 1303 as a preview to the note set, the application enables the user to more conveniently browse through many sets of notes, that otherwise might be difficult to display on a touch screen as a whole page of notes, in a way that a typical user can view easily.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as FORTRAN, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.)

While the invention has been particularly shown and described with reference to specific embodiments, it will be understood by those skilled in the art that various changes in form and detail may be made therein without departing from the spirit and scope of the invention as defined by the appended clauses. As will be apparent to those skilled in the art, techniques described above may be used with different note pages that include indicia for identifying pages.

Embodiments of the present invention may be described, without limitation, by the following clauses. While these embodiments have been described in the clauses by process steps, an apparatus comprising a computer with associated display capable of executing the process steps in the clauses below is also included in the present invention. Likewise, a computer program product including computer executable instructions for executing the process steps in the clauses below and stored on a computer readable medium is included within the present invention.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A system for capturing, organizing, and storing handwritten notes, the system comprising:
   a notebook having a set of pages, wherein each page has placed thereon a folio identifier representation, such representation including a page identifier; and
   a non-transitory computer readable medium encoded with instructions, which, when running on a camera-equipped computing device at a time when the camera thereof views a page of the notebook, causes performance of processes including to:
      process an image associated with the page:
         to unwarp the page image into a rectangular image,
         to remove background from the page image, so that the image is cropped to conform to the page, and
         to enhance the page image,
      detect and decode the folio identifier representation to provide a page identifier for the page,
      use the page identifier to determine if the image of the page has not been previously captured, and if the image has not been previously captured, save the image in an image store.

2. A system according to claim 1, wherein:
   each page of the notebook has a predominant background color, and a border having a border color that contrasts with the predominant background color, and
   the processes performed by the computing device further includes to use presence of the border to detect presence of the page and boundaries of the page.

3. A system according to claim 1, wherein processing the image associated with the page to enhance the page image includes processing a plurality of images associated with the page to produce a composite image of the page.

4. A system according to claim 1, wherein:
   each page of the notebook has placed thereon a set of destination symbols, wherein a user can generally mark a selected destination symbol on a selected page of the notebook to indicate the start of a note set on the selected page and can otherwise mark the selected destination symbol on the selected page to indicate the continuation of a note set on the selected page, and the processes performed by the computing device further including:

in a destination symbol process, determining, for each of the destination symbols on the page, whether such symbol has received general marking, continuation marking, or no marking, routing the page image to a set of destinations based on determinations from the destination symbol process.

5. A system according to claim 4, wherein the destination is an email address.

6. A system according to claim 4, wherein the destination is cloud based storage.

7. A system according to claim 4, wherein marking the destination symbol comprises drawing a line at least partially through the destination symbol.

8. A system according to claim 1, wherein the processes performed by the computing device are performed while a plurality of pages of the notebook are being flipped by the user.

9. A system according to claim 1, wherein a destination symbol process determines for each of the destination symbols on the page, whether such destination symbol has received a marking, and adds the page to a note set associated with each marked destination symbol.

10. A system according to claim 1, wherein the folio identifier representation is a bar code.

11. A system according to claim 1, wherein the folio identifier representation is a quick response code.

12. A system according to claim 1, further comprising removing the background on the page in the image.

13. A method according to claim 1, wherein marking the destination symbol comprises drawing a line at least partially through the destination symbol.

14. A method for capturing, organizing, and storing handwritten notes, the method comprising:

providing a notebook having a set of pages, each page in the set of pages having:

a folio identifier representation, the folio identifier representation including a page identifier, and a destination symbol configured to be marked by a user, the destination symbol associated with a destination, the notebook being configured so that when an electronic device scans the pages to create an image:

the pages are distinguished from the background external to the page so that the image is substantially of the page, and the images are organized based on at least one of the page identifier and the destination symbol;

unwarping the image;

enhancing the image; and forwarding the image to the destination associated with the marked destination symbol.

15. A method according to claim 14, further comprising:

detecting and decoding the folio identifier representation to provide a page identifier for the page;

using the page identifier to determine if the image of the page has not been previously captured; and if the image has not been previously captured, capturing the image of the page and saving the image in an image store.

16. A method according to claim 14, wherein the pages are distinguished from the background external to the page by identifying a page border.

17. A method according to claim 14, wherein the folio identifier representation is a bar code.

18. A method according to claim 14, wherein the folio identifier representation is a quick response code.

19. A method according to claim 14, wherein the destination is an email address.

20. A method according to claim 14, wherein the destination is a Google drive doc.

21. A method according to claim 14, wherein scanning comprises taking a photograph with a camera equipped computing device.

22. A method according to claim 21, further comprising activating the flash of the camera.

23. A method according to claim 14, further comprising removing the background internal to the page on the image.

* * * * *